(12) United States Patent
Koff (10) Patent No.: US 10,974,560 B2
(45) Date of Patent: Apr. 13, 2021

(54) SUSPENSION WITH JOUNCE BUMPER BALANCED FOR CASTER CONTROL

(71) Applicant: Rivian IP Holdings, LLC, Plymouth, MI (US)

(72) Inventor: Max Koff, Ann Arbor, MI (US)

(73) Assignee: Rivian IP Holdings, LLC, Plymouth, MI (US)

(*) Notice: Subject to any disclaimer, the term of this patent is extended or adjusted under 35 U.S.C. 154(b) by 70 days.

(21) Appl. No.: 16/190,956

(22) Filed: Nov. 14, 2018

(65) Prior Publication Data

US 2020/0148021 A1    May 14, 2020

(51) Int. Cl.
*B60G 7/04* (2006.01)
*B60G 3/20* (2006.01)
*B60G 15/06* (2006.01)

(52) U.S. Cl.
CPC .................. *B60G 7/04* (2013.01); *B60G 3/20* (2013.01); *B60G 15/06* (2013.01); *B60G 2200/14* (2013.01); *B60G 2204/125* (2013.01); *B60G 2204/129* (2013.01); *B60G 2204/1244* (2013.01); *B60G 2206/73* (2013.01)

(58) Field of Classification Search
CPC .......... B60G 2202/32; B60G 2202/322; B60G 7/04; B60G 3/20; B60G 3/18; B60G 2204/1244; B62D 17/00; F16F 9/56; F16F 9/58
See application file for complete search history.

(56) References Cited

U.S. PATENT DOCUMENTS

| | | | |
|---|---|---|---|
| 2,122,476 A | 7/1938 | Leighton | |
| 2,182,248 A | 12/1939 | Chayne | |
| 4,747,587 A * | 5/1988 | Ferrel | B60G 13/003 267/219 |
| 5,851,016 A * | 12/1998 | Kawagoe | B60G 3/20 280/124.148 |

(Continued)

FOREIGN PATENT DOCUMENTS

EP    2161147    3/2010

OTHER PUBLICATIONS

Fourwheeler Network / Extreme Ventures, LLC dba TEN, 2017 Ram 2500 Power Wagon Rear Axle—Photo 13 product p. 3, 2018.

(Continued)

*Primary Examiner* — James A English
(74) *Attorney, Agent, or Firm* — Clements Bernard Walker; Christopher L. Bernard (57) ABSTRACT

A suspension includes a jounce bumper, and a striker. A spring biases the knuckle toward a first position. One of the spring and the jounce bumper is disposed forward of a kingpin axis of the knuckle and the other of the spring and the jounce bumper is disposed rearward of the kingpin axis. When in a first position, the spring is a first spring length. When in a second position, the spring is shorter than in the first position and the jounce bumper contacts the striker. When in a third position, the spring is shorter than in the second position and the jounce bumper is compressed against the striker to be shorter than in the second position. When moving between the second and third positions, the spring and jounce bumper impart moments on the knuckle that approximately balance each other to maintain a desired caster angle.

20 Claims, 3 Drawing Sheets

(56) References Cited

U.S. PATENT DOCUMENTS

| | | | | |
|---|---|---|---|---|
| 6,357,772 B1* | 3/2002 | Pelz | ............... | B60G 3/18 |
| | | | | 280/124.135 |
| 6,764,085 B1 | 7/2004 | Anderson | | |
| 7,784,806 B2* | 8/2010 | Schmidt | ............... | B60G 3/20 |
| | | | | 280/124.134 |
| 7,963,538 B2* | 6/2011 | Roland | ............... | B60G 3/26 |
| | | | | 280/124.138 |
| 8,210,551 B2* | 7/2012 | Jakob | ............... | B60G 3/145 |
| | | | | 280/124.116 |
| 9,333,824 B2* | 5/2016 | Zandbergen | ............... | B60G 3/20 |
| 9,610,820 B1* | 4/2017 | Chen | ............... | B60G 3/18 |
| 2005/0140110 A1* | 6/2005 | Lee | ............... | B60G 7/008 |
| | | | | 280/124.109 |
| 2008/0179148 A1* | 7/2008 | Quinn | ............... | B60G 17/08 |
| | | | | 188/322.13 |
| 2016/0009157 A1* | 1/2016 | Al-Dahhan | ............... | F16F 1/3713 |
| | | | | 280/124.162 |
| 2019/0375260 A1* | 12/2019 | Bakker | ............... | B60G 3/20 |

OTHER PUBLICATIONS

SuperPro Suspension Parts and Poly Bushings for Holden Commodore VT Sedan & Wagon—1997-2000, produc pp. 1-4.
International Search Report for International Application PCT/US2019/057777, dated Feb. 11, 2020.

\* cited by examiner

SUSPENSION WITH JOUNCE BUMPER BALANCED FOR CASTER CONTROL

FIELD

The present disclosure relates generally to a vehicle suspension and more specifically to a vehicle suspension configured for caster control.

BACKGROUND

The statements in this section merely provide background information related to the present disclosure and may not constitute prior art.

Caster angle is one vehicle characteristic that can impact vehicle handling and ride comfort. Caster angle is generally defined by the angle, when viewed perpendicular to the side of the vehicle, between an axis perpendicular to the ground at the contact patch of a vehicle wheel and a real or virtual kingpin axis. When referring to a steerable wheel (e.g., front wheel of a front wheel steering vehicle), the kingpin axis is the axis about which the wheel rotates when steering. When referring to a non-steerable wheel (e.g., a rear wheel of a front wheel steering vehicle), the kingpin axis can generally be the axis about which the wheel would tend to rotate when a force is applied perpendicular to the side of to the wheel. In some vehicle suspensions, the virtual kingpin axis is the axis between two joints (e.g., ball joints) that connect to the wheel knuckle to two control arms. In some other vehicle suspensions, the virtual kingpin axis is determined based on the combined geometry of multiple control arms or other links between the knuckle and the vehicle's frame. In some other suspensions, the virtual kingpin axis is perpendicular to the ground surface and extends from the contact patch through the center of the wheel.

Certain dynamic conditions and compliance in the suspension can cause the caster angle of a vehicle's knuckle to change from the preferred caster angle. This change is typically referred to as caster windup. In some situations, such caster windup can negatively impact the vehicle performance. For example, caster windup could cause the wheel to contact the body, or some suspension components to bottom out. Caster windup can also result in a change of camber and toe angle of the vehicle wheel.

Typical suspensions include a spring, a damper, and a jounce bumper. The jounce bumper is typically configured to prevent bottoming out (i.e., rigid metal on metal contact) of the suspension with the frame and are typically designed to minimize noise, and improve ride comfort for occupants. However, in some suspension configurations, the spring, damper, and jounce bumper can contribute to undesirable caster windup. Accordingly, these issues with caster windup are addressed by the present disclosure.

SUMMARY

In one form, a suspension assembly for a vehicle having a frame includes a knuckle, a plurality of control arms, a spring, a damper, a jounce bumper, and a striker. The knuckle is adapted to support a wheel hub for rotation relative to the knuckle. The control arms couple the knuckle to the frame and permit the knuckle to move relative to the frame between a first position, a second position, and a third position. The spring biases the knuckle toward the first position. The damper dampens oscillation between the frame and the knuckle. One of the spring and the jounce bumper is disposed forward of a kingpin axis of the knuckle and the other of the spring and the jounce bumper is disposed rearward of the kingpin axis. When the knuckle is in the first position, the spring is a first spring length. When the knuckle is in the second position, the spring is a second spring length that is less than the first spring length and the jounce bumper is in contact with the striker and is a first bumper length. When the knuckle is in the third position, the spring is a third spring length that is less than the second spring length and the jounce bumper is compressed against the striker to be a second bumper length that is less than the first bumper length. When the knuckle moves between the second and third positions, the spring, the damper, and the jounce bumper impart moments on the knuckle that approximately balance each other to maintain a desired caster angle of the knuckle.

According to a further form, when the knuckle is in the first position, the jounce bumper is spaced apart from the striker. When the knuckle is in the second position, the jounce bumper contacts the striker.

According to a further form, the jounce bumper is formed of a closed cell foam material.

According to a further form, the jounce bumper is mounted to the damper.

According to a further form, the jounce bumper is spaced apart from the damper.

According to a further form, when the knuckle moves between the second and third positions, the spring and jounce bumper impart moments on the knuckle that are opposite in direction and approximately equal in magnitude.

According to a further form, the spring is mounted between the frame and a first control arm of the plurality of control arms.

According to a further form, the damper is mounted between the frame and the first control arm.

According to a further form, the jounce bumper is mounted between the frame and either the knuckle or a second control arm of the plurality of control arms.

According to a further form, the damper is mounted between the frame and a second control arm of the plurality of control arms.

According to a further form, the jounce bumper is mounted between the frame and either the knuckle or one of the plurality of control arms that is not the first control arm.

According to a further form, the damper is mounted between the frame and the knuckle.

According to a further form, the jounce bumper is mounted between the frame and either the knuckle or one of the plurality of control arms that is not the first control arm.

According to a further form, the spring is mounted between the frame and the knuckle.

According to a further form, the damper is mounted between the frame and the knuckle.

According to a further form, jounce bumper is mounted between the frame and either the knuckle or one of the plurality of control arms.

According to a further form, the damper is mounted between the frame and one of the control arms.

According to a further form, the jounce bumper is mounted between the frame and either the knuckle or one of the control arms.

According to a further form, the striker is fixedly coupled to a portion of the damper.

In another form, a suspension assembly for a vehicle having a frame includes a knuckle, a plurality of control arms, a spring, a damper, a jounce bumper, and a striker. The knuckle is adapted to support a wheel hub for rotation relative to the knuckle. The plurality of control arms couple the knuckle to the frame and permit the knuckle to move relative to the frame between a first position, a second position, and a third position. The spring is mounted between the frame and either the knuckle or a first control arm of the plurality of control arms. The spring biases the knuckle toward the first position. The damper is mounted between the frame and either the knuckle or a second control arm of the plurality of control arms. The damper is configured to dampen oscillation between the frame and the knuckle. The jounce bumper is mounted to one of the frame and the damper. The spring and the jounce bumper are disposed on opposite sides of a kingpin axis of the knuckle. The striker is mounted to the other one of the frame and the damper. When the knuckle is in the first position, the spring is a first spring length and the jounce bumper is spaced apart from the striker. When the knuckle is in the second position, the spring is a second spring length that is less than the first spring length and the jounce bumper is in contact with the striker and a first bumper length. When the knuckle is in the third position, the spring is a third spring length that is less than the second spring length and the jounce bumper is compressed against the striker to be a second bumper length that is less than the first bumper length. When the knuckle moves between the second and third positions, the spring, damper, and jounce bumper impart moments on the knuckle that approximately balance each other to maintain a desired caster angle of the knuckle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
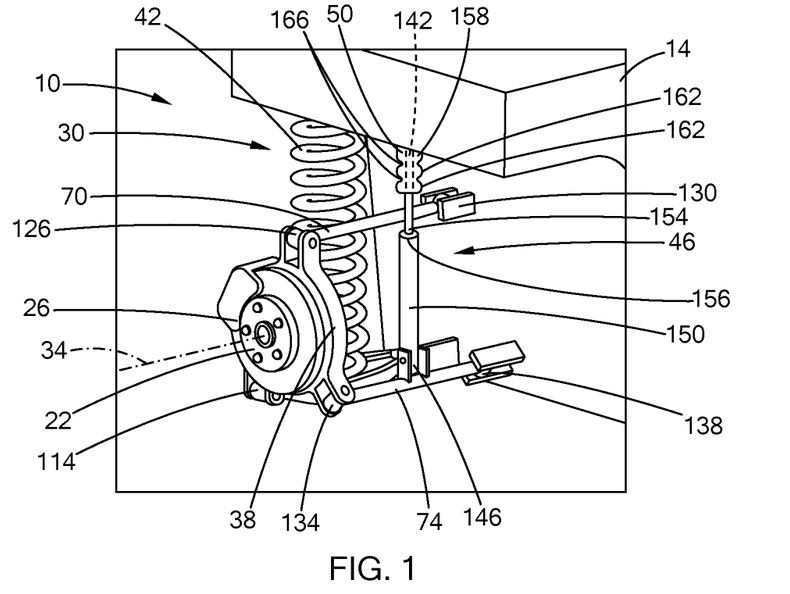
FIG. 1 is a perspective view of a portion of a vehicle suspension including a spring and a jounce bumper in accordance with the teachings of the present disclosure, illustrating the suspension in a first position.
Figure 2:
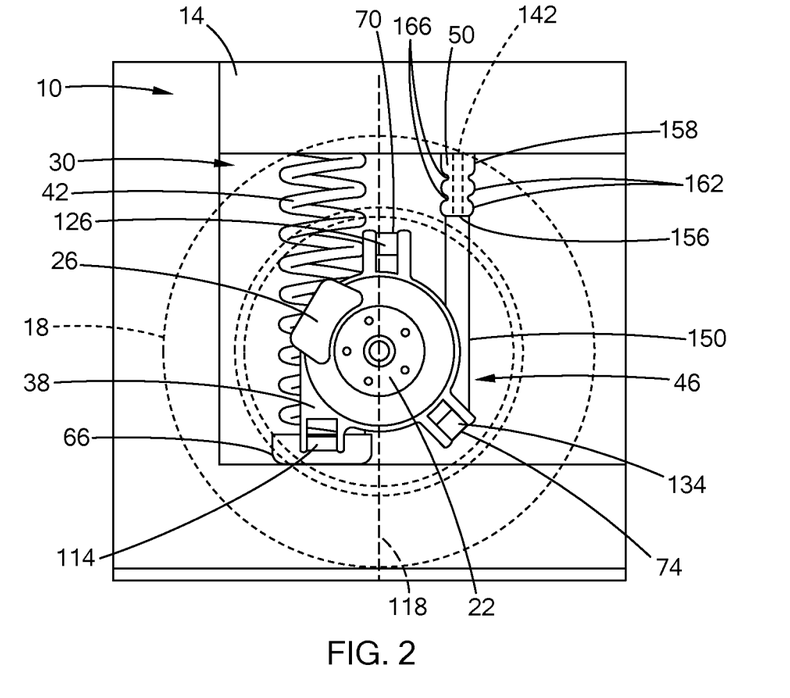
FIG. 2 is a side view of the suspension of FIG. 1, illustrating the suspension in a second position.

With reference to FIGS. 1 and 2, a portion of a vehicle 10 (e.g., an automobile) is illustrated. The vehicle 10 includes a vehicle frame 14, a wheel 18 (shown in phantom lines in FIGS. 2 and 3), a hub 22, a brake 26, and a suspension system 30. While only the right rear portion of the vehicle 10 is illustrated, it is understood that the left rear portion of the vehicle 10 can be similar to the right rear portion. While described herein with reference to the rear vehicle suspension, the teachings of the present disclosure can also apply to a front suspension.

The vehicle frame 14 can be any suitable type of vehicle frame (e.g., the frame of a body-on-frame vehicle, a subframe or structural feature of a unibody frame vehicle or of a monocoque frame vehicle). The wheel 18 is mounted to the hub 22 for common rotation with the hub 22 about the rotational axis 34 of the wheel. In the example provided, the hub 22 includes a plurality of lug studs that extend through bores in the wheel 18 and the wheel 18 is secured to the hub 22 by a plurality of lug nuts (not shown), though other configurations can be used. As used herein, the term "hub", encompasses both a driven hub that receives rotary power from a driveshaft (not shown) or a non-driven hub (also known as a spindle). The suspension system 30 generally couples the hub 22 to the frame 14 and supports the frame 14 relative to the hub 22 and wheel 18 as discussed in greater detail below. In the example provided, the brake 26 is a disc brake including a rotor coupled to the hub 22 for common rotation about the wheel axis 34 and a caliper configured to impart a braking force on the rotor to resist rotation of the wheel 18, though other configurations (e.g., drum brakes, air brakes, magnetic brakes, etc.) can be used.

The suspension system 30 includes a knuckle 38, a spring 42, a damper 46, a jounce bumper 50, and a plurality of control arms. In the example provided, the plurality of control arms includes a lower control arm 66, an upper control arm (referred to herein as a camber link 70), and a second lower control arm (referred to herein as a toe link 74).

The knuckle 38 rotatably supports the hub 22 such that the hub 22 can rotate about the wheel axis 34 relative to the knuckle 38. In the example provided, the caliper of the brake 26 is coupled to the knuckle 38 such that the caliper is rotationally fixed relative to the knuckle 38, while the rotor can rotate with the hub 22. Accordingly, activation of the brake 26 resists rotation of the hub 22 and wheel 18 relative to the knuckle 38.

The plurality of control arms generally couple the knuckle 38 to the frame 14. In the example provided, the lower control arm 66 includes an inboard end, an outboard end, and a rigid body that extends between the inboard and outboard ends of the lower control arm 66 to define a spring perch 110. The outboard end of the lower control arm 66 is mounted to the knuckle 38 to form a first outboard joint 114 located at a first location on the knuckle 38. In the example provided, the first location on the knuckle 38 is located proximate to a bottom of the knuckle 38 and rearward of a center axis 118 (shown in FIGS. 2 and 3) of the hub 22, though other configurations can be used. The center axis 118 intersects the point of contact between the wheel 18 and the center of the hub 22. In the example provided, the kingpin axis is approximated by the center axis 118 for ease of illustration, but the kingpin axis can be oriented differently based on the connection locations and connection types of the control arms 66, 70, 74.

The outboard end of the lower control arm 66 is mounted to the knuckle 38 such that the knuckle 38 can pivot relative to the lower control arm 66. For example, the first outboard joint 114 can be a pivot joint or a ball joint and can include a first outboard bushing (not specifically shown) providing compliance in the first outboard joint 114. Thus, the first outboard joint 114 can pivotably couple the lower control arm 66 to the knuckle 38 so that the lower control arm 66 can pivot about one or more axes at the first outboard joint 114.

The inboard end of the lower control arm 66 is mounted to the frame 14 to form a first inboard joint 122 at a first location on the frame 14. The inboard end of the lower control arm 66 can be mounted to the frame 14 in a manner that permits the outboard end of the lower control arm 66 to move generally up and down with travel of the wheel 18. For example, the first inboard joint 122 can be a pivot joint or a ball joint. Thus, the first inboard joint 122 can pivotably couple the lower control arm 66 to the frame 14 so that the lower control arm 66 can pivot about one or more axes at the first inboard joint 122. The first inboard joint 122 can include a first inboard bushing (not specifically shown) providing compliance in the first inboard joint 122.

The spring perch 110 is configured to support one end of the spring 42. The other end of the spring 42, either directly or indirectly, engages a part of the frame 14 above the lower spring perch 110, such as through an upper spring perch (not specifically shown). In the example provided, the spring 42 is a helical coil spring that biases the knuckle 38 away from the frame 14 and resiliently supports the frame 14 relative to the knuckle 38. In the example provided, the spring 42 is located rearward of the center axis 118 of the suspension system 30, though other configurations can be used.

The camber link 70 includes an inboard end, an outboard end, and a rigid body that extends between the inboard and outboard ends of the camber link 70. The outboard end of the camber link 70 is mounted to the knuckle 38 to form a second outboard joint 126 located at a second location on the knuckle 38. The second location on the knuckle 38 is a different location than where the lower control arm 66 connects at the first location. In the example provided, the second location on the knuckle 38 is located proximate to a top of the knuckle 38 and is near, but slightly forward of the center axis 118, though other configurations can be used. The outboard end of the camber link 70 is mounted to the knuckle 38 such that the knuckle 38 can pivot relative to the camber link 70. For example, the second outboard joint 126 can be a pivot joint or a ball joint. Thus, the second outboard joint 126 can pivotably couple the camber link 70 to the frame knuckle 38 so that the camber link 70 can pivot about one or more axes at the second outboard joint 126. The second outboard joint 126 can include a second outboard bushing (not specifically shown) providing compliance in the second outboard joint 126.

The inboard end of the camber link 70 is mounted to the frame 14 to form a second inboard joint 130 at a second location on the frame 14. The inboard end of the camber link 70 can be mounted to the frame 14 in a manner that permits the outboard end of the camber link 70 to move generally up and down with travel of the wheel 18. For example, the second inboard joint 130 can be a pivot joint or a ball joint. Thus, the second inboard joint 130 can pivotably couple the camber link 70 to the frame 14 so that the camber link 70 can pivot about one or more axes at the second inboard joint 130. The second inboard joint 130 can include a second inboard bushing (not specifically shown) providing compliance in the second inboard joint 130. Accordingly, the length of the camber link 70 relative to the lower control arm 66 can control the camber angle of the wheel 18.

The toe link 74 includes an inboard end, an outboard end, and a rigid body that extends between the inboard and outboard ends of the toe link 74. The outboard end of the toe link 74 is mounted to the knuckle 38 to form a third outboard joint 134 located at a third location on the knuckle 38. The third location on the knuckle 38 is a different location than where the lower control arm 66 connects at the first location and is a different location than where the camber link 70 connects at the second location. In the example provided, the third location on the knuckle 38 is located proximate to a bottom of the knuckle 38 and forward of the center axis 118, though other configurations can be used. The outboard end of the toe link 74 is mounted to the knuckle 38 such that the knuckle 38 can pivot relative to the toe link 74. For example, the third outboard joint 134 can be a pivot joint or a ball joint. Thus, the third outboard joint 134 can pivotably couple the toe link 74 to the knuckle 38 so that the toe link 74 can pivot about one or more axes at the third outboard joint 134. The third outboard joint 134 can include a third outboard bushing (not specifically shown) providing compliance in the third outboard joint 134.

The inboard end of the toe link 74 is mounted to the frame 14 to form a third inboard joint 138 at a third location on the frame 14. The inboard end of the toe link 74 can be mounted to the frame 14 in a manner that permits the outboard end of the toe link 74 to move generally up and down with travel of the wheel 18. For example, the third inboard joint 138 can be a pivot joint or a ball joint. Thus, the third inboard joint 138 can pivotably couple the toe link 74 to the frame 14 so that the toe link 74 can pivot about one or more axes at the third inboard joint 138. The third inboard joint 138 can include a third inboard bushing (not specifically shown) providing compliance in the third inboard joint 138. Accordingly, the length of the toe link 74 relative to the lower control arm 66 can control the toe angle of the wheel 18.

The damper 46 includes a first damper end 142 and a second damper end 146. The first damper end 142 is mounted to the frame 14 at a fourth location on the frame 14 that is different than the first, second and third locations on the frame 14. The second damper end 146 is movable relative to the first damper end 142 and the damper 46 is configured to generally resist movement of the second damper end 146 relative to the first damper end 142. In the example provided, the damper 46 is an oil filled, piston-cylinder type damper, though other configurations can be used. The second damper end 146 is fixedly coupled to a cylinder 150 and the first damper end 142 is fixedly coupled to a rod 154 that moves the piston (not shown) within the cylinder 150 linearly along an axis of the damper 46. Axial movement of the piston (not shown) relative to the cylinder 150 is resisted by the fluid (not shown) within the cylinder 150. Thus, the damper 46 is configured to impart reaction forces (i.e., a damping force) at the first and second damper ends 142, 146 that resists extension and contraction of the damper 46.

The second damper end 146 is mounted to a component of the suspension system 30 such that vertical movement of the wheel 18 contracts or extends the damper 46. For example, when the vehicle 10 is moving and the wheel 18 moves upwards relative to the frame 14, the component of the suspension system 30 causes the second damper end 146 to move toward the first damper end 142 and the damper 46 resists the contracting with a damper force. Likewise, when the wheel 18 moves downward relative to the frame 14, the component of the suspension system 30 causes the second damper end 146 to move away from the first damper end 142 and the damper 46 resists the extension with a damping force.

In the example provided, the second damper end 146 is mounted to the toe link 74, though other configurations can be used. Thus, in the example provided, the second damper end 146 is forward of the center axis 118 and the damper force can impart a moment on the knuckle 38 that can be opposite the spring 42, though other configurations can be used. In one alternative configuration, not shown, the second damper end 146 can be mounted to camber link 70. In another alternative configuration, not shown, the second damper end 146 can be directly mounted to the knuckle 38.

The jounce bumper 50 is formed of a resilient material (e.g., rubber, closed cell foam, or a resilient polymer) and located on an opposite side of the center axis 118 from the spring 42. In the example provided, the jounce bumper 50 is fixedly coupled to the frame 14 and disposed about the rod 154 of the damper 46 proximate to the first damper end 142, though other configurations can be used. The jounce bumper 50 is aligned to contact a surface of a striker 156. In the example provided, the striker 156 is the top of the cylinder 150, though other configurations can be used. In an alternative configuration, not shown, the jounce bumper 50 can be disposed about the rod 154 proximate to where the rod 154 enters the cylinder 150 and can be fixedly coupled to the cylinder 150 or free to move up axially along the rod 154 relative to the cylinder 150, while the striker 156 can be fixedly mounted to the frame 14.

In the example provided, the jounce bumper 50 is generally cylindrical in shape and has a base 158 and a plurality of bulbs 162 separated by necks 166. The bulbs 162 have outer diameters that are greater than the necks 166, such that the jounce bumper 50 narrows at the necks 166. In the example provided, the bulbs 162 can have progressively smaller diameters, e.g., the bulb 162 nearest the base 158 can have a diameter that is greater than the bulb 162 furthest from the base 158, though other configurations can be used. While two bulbs 162 and two necks 166 are illustrated, the jounce bumper 50 can have more or fewer bulbs 162 and necks 166, including having no specific bulbs or necks.

FIG. 1 illustrates the suspension system 30 in a first position relative to the frame 14. In the first position, the knuckle 38 is a first distance from the frame 14 in the vertical direction relative to the ground. In the first position, the jounce bumper 50 is spaced apart from the striker 156. In the example provided, the first position can be the typical resting position of the suspension system 30, e.g., when the vehicle 10 is in an unloaded condition while stationary or moving in a straight line on a flat ground surface.

With additional reference to FIG. 2, the suspension system 30 is shown in a second position relative to the frame 14. In the second position, the knuckle 38 is a second distance from the frame 14 in the vertical direction relative to the ground, the second distance being less than the first distance. In the second position, the jounce bumper 50 is in contact with the striker 156, but not yet compressed against the striker 156. In the example provided, the second position can occur when the vehicle is in a fully loaded condition, e.g., fully loaded with cargo and occupants while stationary or moving in a straight line on a flat ground surface.

Figure 3:
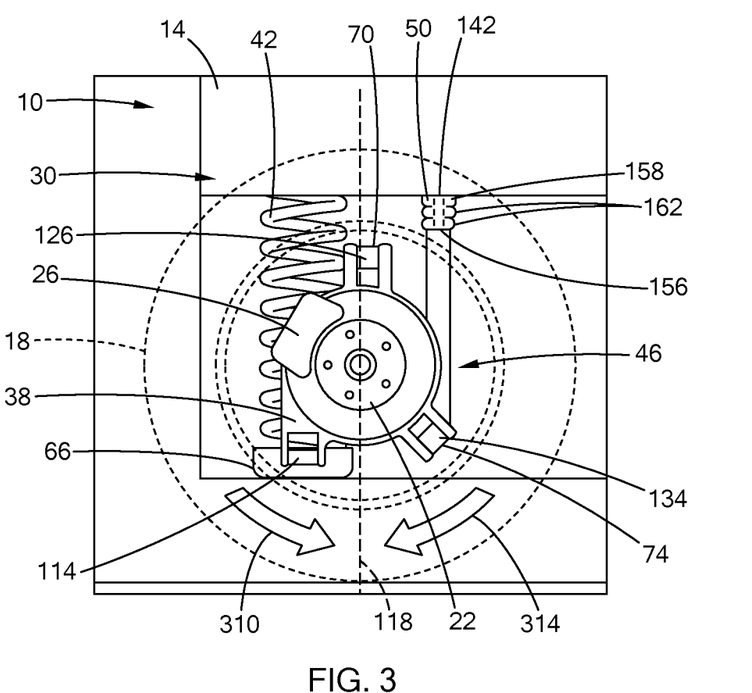
FIG. 3 is a side view of the suspension of FIG. 1, illustrating the suspension in a third position.

With additional reference to FIG. 3, the suspension system 30 is shown in a third position relative to the frame 14. In the third position, the knuckle 38 is a third distance from the frame 14 in the vertical direction relative to the ground, the third distance being less than the second distance. In the third position, the jounce bumper 50 is in contact with the striker 156 and fully compressed between the striker 156 and the frame 14. In the example provided, the third position can occur when the vehicle is in the fully loaded condition and travels over a bump in the ground surface, or is in the fully loaded condition and is an outside wheel during sharp cornering. Since the spring 42 and jounce bumper 50 are connected to the knuckle 38 on opposite sides of the kingpin axis (e.g., the center axis 118), and both impart downward forces on the knuckle 38, the spring 42 and jounce bumper 50 impart opposite moments (shown by arrows 310, 314) on the knuckle 38 when the suspension system 30 is between the second position (FIG. 2) and the third position.

The damper 46 can also impart a moment on the knuckle 38 when the suspension system 30 is moving relative to the frame 14, however the direction of that moment depends on whether the suspension system 30 is moving toward or away from the frame 14. For example, the when the suspension system 30 moves from the second position (FIG. 2) to the third position, the damper 46 imparts a moment in the direction of arrow 314 that is opposite the moment from the spring 42. When the suspension system 30 moves from the third position to the second position (FIG. 2), the damper imparts a moment in the direction of arrow 310 that is opposite the moment from the jounce bumper 50. Accordingly, the moments about the knuckle 38 can be expressed by:

$$M_k = M_s + M_{jb} + M_d$$

In the equation above, $M_k$ is the moments about the knuckle 38, $M_s$ is the moment from the spring 42 (i.e., the spring force times the perpendicular distance to the rotational axis of the knuckle 38), $M_{jb}$ is the moment from the jounce bumper 50 (i.e., the jounce bumper force times the perpendicular distance to the rotational axis of the knuckle 38), and $M_d$ is the moment from the damper 46 (i.e., the damper force times the perpendicular distance to the rotational axis of the knuckle 38). In the example provided, the moment from the damper 46 is configured to be insignificant compared to the moments from the spring 42 and the jounce bumper 50 when the suspension system 30 is moving between the second and third positions. Accordingly, the moments about the knuckle 38 are approximated by:

$$M_k = M_s + M_{jb}$$

Figure 4:
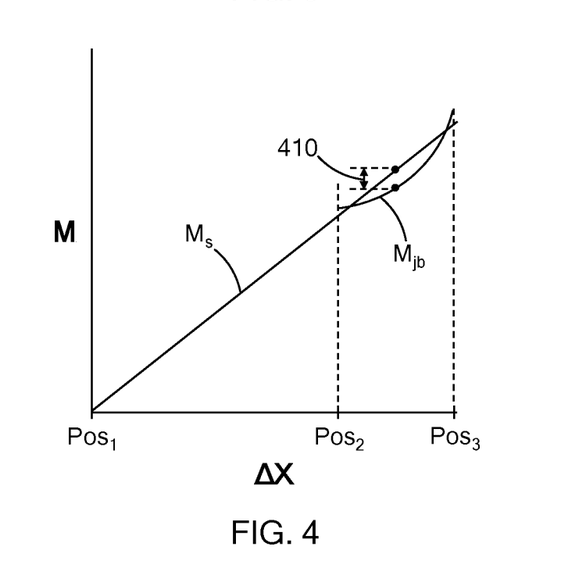
FIG. 4 is a graph illustrating forces of the spring and the jounce bumper with relation to suspension travel.
Figure 5:
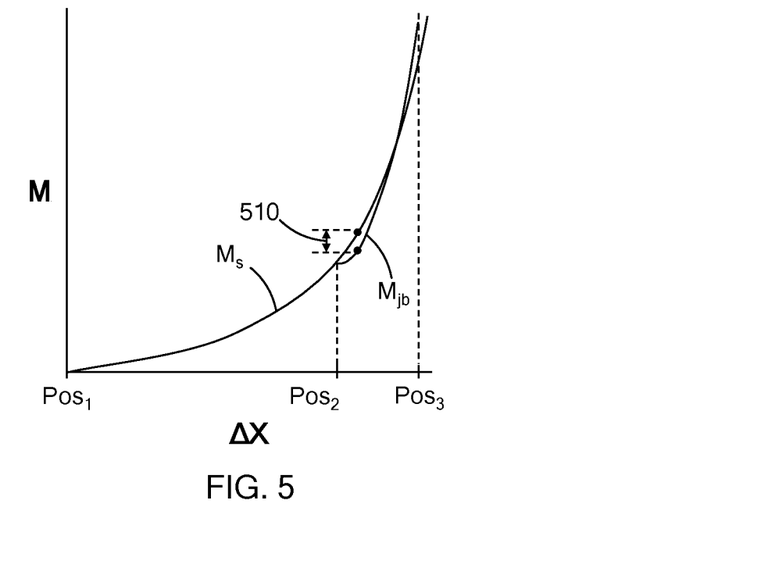
FIG. 5 is a graph illustrating forces of a spring and jounce bumper with relation to suspension travel of a suspension of a second configuration in accordance with the teachings of the present disclosure.

The spring 42 and jounce bumper 50 are configured such that their moments on the knuckle 38 approximately cancel each other out. In other words, $M_k$ is approximately zero in the above equation and $M_s$ and $M_{jb}$ have approximately equal magnitudes and opposite directions. With additional reference to FIG. 4, the magnitudes of the moments on the knuckle 38 produced by spring 42 and by the jounce bumper 50 are graphed with relation to the position of the suspension system 30 (e.g., the amount of compression of the spring 42 and jounce bumper 50). The magnitude of the moment produced by the spring 42 is indicated by line $M_s$. The magnitude of the moment produced by the jounce bumper 50 is indicated by line $M_{jb}$. Between the first position (indicated by $Pos_1$) and the second position (indicated by $Pos_2$), the spring 42 imparts a moment $M_s$ on the knuckle 38. In the example provided, the jounce bumper 50 does not begin imparting a moment until the second position $Pos_2$. Between the second position $Pos_2$ and the third position $Pos_3$, the moments $M_s$ and $M_{jb}$ are approximately equal and have a maximum difference 410 of approximately 18%, though other values can be used and this maximum difference value can depend on the designed sensitivity to castor wind-up (e.g., castor angle change per N*m of spring torque). In the example provided, the spring moment $M_s$ is approximately linear, while the jounce bumper moment $M_{jb}$ is non-linear, though other configurations can be used. For example, FIG. 5 illustrates a graph showing the magnitudes $M_s$ and $M_{jb}$ of different configuration, i.e., wherein the spring 42 is a non-linear spring. In this example, the moments $M_s$ and $M_{jb}$ are still configured to be approximately equal and have a maximum difference 410 of approximately 18%, though other values can be used depending on the designed sensitivity to castor wind-up.

Figure 6:
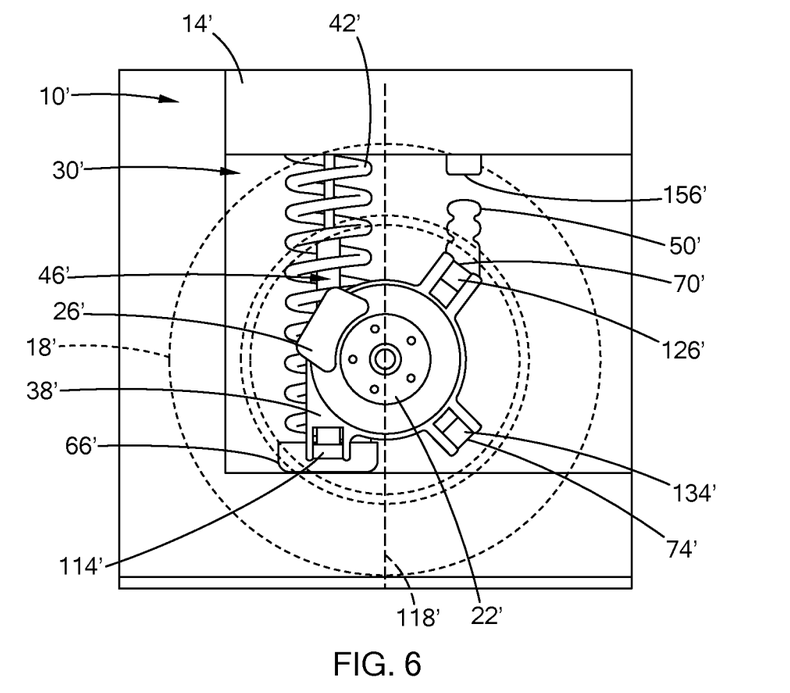
FIG. 6 is a side view of a suspension of a third configuration in accordance with the teachings of the present disclosure.

With additional reference to FIG. 6, a vehicle 10' of a second configuration is illustrated. The vehicle 10' is similar to the vehicle 10 (FIGS. 1-3) except as otherwise shown or described herein. Accordingly, similar elements are shown and described herein with similar, but primed reference numerals and only their differences are described in detail herein. In the example provided, the damper 46' is not mounted between the frame 14' and the toe link 74'. Instead, the damper 46' is mounted coaxially with the spring 42' between the lower control arm 66' and the frame 14'. In the example provided, the camber link 70' is more forward of the center axis 118' than the camber link 70 (FIGS. 1-3). In the example provided, the jounce bumper 50' is not mounted coaxially about the damper 42', but is still mounted on an opposite side of the center axis 118' from the spring 46'. The jounce bumper 50' is mounted to the camber link 70' and the striker 156' is mounted to the frame 14'. In an alternative configuration, not shown, the jounce bumper 50' is mounted to the frame 14' and the striker 156' is mounted to the camber link 70'. As discussed above, the jounce bumper 50' and the spring 42' are configured to produce opposite, but approximately equal moments on the knuckle 38.

The description of the disclosure is merely exemplary in nature and, thus, variations that do not depart from the substance of the disclosure are intended to be within the scope of the disclosure. Such variations are not to be regarded as a departure from the spirit and scope of the disclosure.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A suspension assembly for a vehicle having a frame, the suspension assembly comprising:
   a knuckle adapted to support a wheel hub for rotation relative to the knuckle;
   a plurality of control arms coupling the knuckle to the frame and configured to permit the knuckle to move relative to the frame between a first position, a second position, and a third position;
   a spring biasing the knuckle toward the first position;
   a damper configured to dampen oscillation between the frame and the knuckle;
   a jounce bumper, one of the spring and the jounce bumper being disposed forward of a kingpin axis of the knuckle and the other of the spring and the jounce bumper being disposed rearward of the kingpin axis; and
   a striker;
   wherein when the knuckle is in the first position, the spring is a first spring length;
   wherein when the knuckle is in the second position, the spring is a second spring length that is less than the first spring length and the jounce bumper is in contact with the striker and is a first bumper length;
   wherein when the knuckle is in the third position, the spring is a third spring length that is less than the second spring length and the jounce bumper is compressed against the striker to be a second bumper length that is less than the first bumper length;
   wherein when the knuckle moves between the second and third positions, the spring, the damper, and the jounce bumper impart moments on the knuckle that approximately balance each other to maintain a desired caster angle of the knuckle.

2. The suspension assembly of claim 1, wherein when the knuckle is in the first position, the jounce bumper is spaced apart from the striker, and when the knuckle is in the second position, the jounce bumper contacts the striker.

3. The suspension assembly of claim 1, wherein the jounce bumper is formed of a closed cell foam material.

4. The suspension assembly of claim 1, wherein the jounce bumper is mounted to the damper.

5. The suspension assembly of claim 1, wherein the jounce bumper is spaced apart from the damper.

6. The suspension assembly of claim 1, wherein when the knuckle moves between the second and third positions, the spring and jounce bumper impart moments on the knuckle that are opposite in direction and approximately equal in magnitude.

7. The suspension assembly of claim 1, wherein the spring is mounted between the frame and a first control arm of the plurality of control arms.

8. The suspension assembly of claim 7, wherein the damper is mounted between the frame and the first control arm.

9. The suspension assembly of claim 8, wherein the jounce bumper is mounted between the frame and either the knuckle or a second control arm of the plurality of control arms.

10. The suspension assembly of claim 7, wherein the damper is mounted between the frame and a second control arm of the plurality of control arms.

11. The suspension assembly of claim 10, wherein the jounce bumper is mounted between the frame and either the knuckle or one of the plurality of control arms that is not the first control arm.

12. The suspension assembly of claim 7, wherein the damper is mounted between the frame and the knuckle.

13. The suspension assembly of claim 12, wherein the jounce bumper is mounted between the frame and either the knuckle or one of the plurality of control arms that is not the first control arm.

14. The suspension assembly of claim 1, wherein the spring is mounted between the frame and the knuckle.

15. The suspension assembly of claim 14, wherein the damper is mounted between the frame and the knuckle.

16. The suspension assembly of claim 15, wherein the jounce bumper is mounted between the frame and either the knuckle or one of the plurality of control arms.

17. The suspension assembly of claim 14, wherein the damper is mounted between the frame and one of the control arms.

18. The suspension assembly of claim 17, wherein the jounce bumper is mounted between the frame and either the knuckle or one of the control arms.

19. The suspension assembly of claim 1, wherein the striker is fixedly coupled to a portion of the damper.

20. A suspension assembly for a vehicle having a frame, the suspension assembly comprising:

a knuckle adapted to support a wheel hub for rotation relative to the knuckle;

a plurality of control arms coupling the knuckle to the frame and configured to permit the knuckle to move relative to the frame between a first position, a second position, and a third position;

a spring mounted between the frame and either the knuckle or a first control arm of the plurality of control arms, the spring biasing the knuckle toward the first position;

a damper mounted between the frame and either the knuckle or a second control arm of the plurality of control arms, the damper configured to dampen oscillation between the frame and the knuckle;

a jounce bumper mounted to one of the frame and the damper, wherein the spring and the jounce bumper are disposed on opposite sides of a kingpin axis of the knuckle; and a striker mounted to the other one of the frame and the damper;

wherein when the knuckle is in the first position, the spring is a first spring length and the jounce bumper is spaced apart from the striker, when the knuckle is in the second position, the spring is a second spring length that is less than the first spring length and the jounce bumper is in contact with the striker and a first bumper length, and when the knuckle is in the third position, the spring is a third spring length that is less than the second spring length and the jounce bumper is compressed against the striker to be a second bumper length that is less than the first bumper length;

wherein when the knuckle moves between the second and third positions, the spring, damper, and jounce bumper impart moments on the knuckle that approximately balance each other to maintain a desired caster angle of the knuckle.

\* \* \* \* \*